United States Patent
Parendo et al.

(10) Patent No.: US 11,407,039 B2
(45) Date of Patent: Aug. 9, 2022

(54) DRILL BIT

(71) Applicant: MILWAUKEE ELECTRIC TOOL CORPORATION, Brookfield, WI (US)

(72) Inventors: Brett A. Parendo, Milwaukee, WI (US); Alexander R. Greenhill, Wauwatosa, WI (US); David Hlavac, Germantown, WI (US); Carter A. Gibson, Port Washington, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/260,226

(22) Filed: Jan. 29, 2019

(65) Prior Publication Data

US 2019/0232391 A1    Aug. 1, 2019

Related U.S. Application Data

(60) Provisional application No. 62/623,010, filed on Jan. 29, 2018.

(51) Int. Cl.
  *B23B 51/02*    (2006.01)

(52) U.S. Cl.
  CPC ........ *B23B 51/02* (2013.01); *B23B 2251/046* (2013.01); *B23B 2251/14* (2013.01); *B23B 2251/18* (2013.01)

(58) Field of Classification Search
  CPC ............ B23B 2251/08; B23B 2251/14; B23B 2251/18; B23B 2251/046; B23B 2251/04; B23B 51/02; B23B 2228/08; B23B 51/009; B23B 51/10; B23B 51/109
  See application file for complete search history.

(56) References Cited

U.S. PATENT DOCUMENTS

| | | |
|---|---|---|
| 4,044,439 A | 8/1977 | Romagnolo |
| 4,968,193 A | 11/1990 | Chaconas et al. |
| 5,288,183 A | 2/1994 | Chaconas et al. |
| 5,800,100 A | 9/1998 | Krenzer |
| 5,853,267 A | 12/1998 | Satran et al. |

(Continued)

FOREIGN PATENT DOCUMENTS

| | | |
|---|---|---|
| CN | 2863328 Y | 1/2007 |
| CN | 2875659 Y | 3/2007 |

(Continued)

*Primary Examiner* — Chwen-Wei Su
(74) *Attorney, Agent, or Firm* — Michael Best & Friedrich LLP

(57) ABSTRACT

A drill bit includes a body having a first end, a second end opposite the first end, and an axis of rotation extending centrally through the body. The drill bit includes a cutting head with a cutting tip on the axis of rotation and a cutting portion. The cutting portion includes first tip surfaces on opposite sides of the axis of rotation and second tip surfaces on opposite sides of the axis of rotation. Each first tip surface extends radially outward from the cutting tip to a corresponding second tip surface. Each second tip surface extends from a corresponding first tip surface to an outer periphery of the body. The first tip surfaces define a first tip angle measured through the axis of rotation that is oblique. The second tip surfaces define a second tip angle measured through the axis of rotation that is smaller than the first tip angle.

14 Claims, 2 Drawing Sheets

(56) References Cited

U.S. PATENT DOCUMENTS

| | | | |
|---|---|---|---|
| 6,050,754 A * | 4/2000 | Thomas | B23B 51/02 408/224 |
| 6,126,367 A * | 10/2000 | Reed | B23B 51/02 408/1 R |
| 6,164,879 A | 12/2000 | Krenzer | |
| 6,217,263 B1 | 4/2001 | Wiman et al. | |
| 6,234,726 B1 | 5/2001 | Okada et al. | |
| 6,315,504 B1 | 11/2001 | Sekiguchi et al. | |
| 6,652,203 B1 * | 11/2003 | Risen, Jr. | B23B 51/02 408/225 |
| 7,140,815 B2 | 11/2006 | George et al. | |
| 7,201,543 B2 | 4/2007 | Muhlfriedel et al. | |
| 7,237,986 B2 | 7/2007 | Anjanappa et al. | |
| 7,241,085 B2 * | 7/2007 | Frisendahl | B23B 51/02 408/144 |
| 7,717,654 B2 | 5/2010 | Cirino | |
| 7,837,418 B2 | 11/2010 | Lang et al. | |
| 7,896,586 B2 | 3/2011 | Morgulis | |
| 8,550,756 B2 | 10/2013 | Borschert et al. | |
| 8,740,515 B2 * | 6/2014 | Thomas | B23B 51/02 408/144 |
| 8,840,347 B2 | 9/2014 | Aare | |
| 8,979,445 B2 | 3/2015 | Sampath et al. | |
| 9,004,825 B2 * | 4/2015 | Gruber | B23B 51/02 408/1 R |
| 9,199,312 B2 | 12/2015 | Chen et al. | |
| 9,199,315 B2 | 12/2015 | Muhlfriedel et al. | |
| 9,731,358 B2 | 8/2017 | Allen et al. | |
| 2003/0202853 A1 * | 10/2003 | Ko | B23B 51/02 408/225 |
| 2005/0053438 A1 | 3/2005 | Wetzl et al. | |
| 2006/0056930 A1 | 3/2006 | Rompel | |
| 2006/0120814 A1 | 6/2006 | Lipohar et al. | |
| 2007/0081870 A1 | 4/2007 | Muhlfriedel et al. | |
| 2007/0253788 A1 | 11/2007 | Miebach | |
| 2007/0274794 A1 | 11/2007 | Cirino | |
| 2009/0279965 A1 | 11/2009 | Soittu | |
| 2011/0079445 A1 | 4/2011 | Nomura | |
| 2012/0230785 A1 | 9/2012 | Chen et al. | |
| 2013/0039709 A1 | 2/2013 | Goh et al. | |
| 2014/0356088 A1 | 12/2014 | Santamarina et al. | |
| 2017/0209942 A1 * | 7/2017 | Chien | B23B 51/02 |
| 2017/0326651 A1 | 11/2017 | Allen et al. | |
| 2017/0368613 A1 | 12/2017 | Straka et al. | |

FOREIGN PATENT DOCUMENTS

| | | | |
|---|---|---|---|
| CN | 102205436 A | 10/2011 | |
| CN | 202317168 U | 7/2012 | |
| CN | 202336614 U | 7/2012 | |
| CN | 102416494 B | 9/2013 | |
| CN | 203292555 U | 11/2013 | |
| CN | 203356677 U | 12/2013 | |
| CN | 203409319 U | 1/2014 | |
| CN | 203495300 U | 3/2014 | |
| CN | 102642041 B | 11/2014 | |
| CN | 104338980 A | 2/2015 | |
| CN | 204295019 U | 4/2015 | |
| CN | 103273120 B | 1/2016 | |
| CN | 205183873 U | 4/2016 | |
| CN | 205254197 U | 5/2016 | |
| CN | 205668086 U | 11/2016 | |
| CN | 106216743 A | 12/2016 | |
| CN | 205764070 U | 12/2016 | |
| CN | 205914806 U | 2/2017 | |
| CN | 206083948 U | 4/2017 | |
| CN | 107008952 A | 8/2017 | |
| CN | 107186251 A | 9/2017 | |
| CN | 107262785 A | 10/2017 | |
| CN | 206653008 U | 11/2017 | |
| CN | 206702276 U | 12/2017 | |
| DE | 2933632 A1 | 2/1980 | |
| DE | 1117486 C2 | 7/1995 | |
| DE | 102008029404 A1 | 12/2009 | |
| EP | 2441544 A1 | 4/2012 | |
| EP | 2047932 B1 | 12/2016 | |
| GB | 2028190 A | 3/1980 | |
| JP | 07080714 A * | 3/1995 | |
| WO | WO-2012017645 A1 * | 2/2012 | B23B 51/02 |

* cited by examiner

DRILL BIT

CROSS REFERENCE TO RELATED APPLICATIONS

This application claims priority to U.S. Provisional Patent Application No. 62/623,010, filed Jan. 29, 2018, the entire contents of which are incorporated herein by reference.

BACKGROUND

The present invention relates to drill bits

Drill bits are generally used with power tools such as rotary drills or hammer-type drills to cut or carve holes into a material or surface. Drill bits are used to cut holes into a variety of materials such as brick, block, tile, metal, marble, concrete, plaster, wood, plastic, dry-wall, etc., or any combination thereof. Drill bits need to be versatile, but also need to be durable to withstand drilling in abrasive materials.

SUMMARY

In one embodiment, the invention provides a drill bit including a body having a first end, a second end opposite the first end, and an axis of rotation extending centrally through the body from the first end to the second end. The drill bit also includes a shank adjacent the second end. The shank is configured to couple to a tool. The drill bit further includes a cutting head adjacent the first end. The cutting head including a cutting tip on the axis of rotation and a cutting portion. The cutting portion includes first tip surfaces on diametrically opposite sides of the axis of rotation and second tip surfaces on diametrically opposite sides of the axis of rotation. Each first tip surface extends radially outward from the cutting tip to a corresponding second tip surface. Each second tip surface extends from a corresponding first tip surface to an outer periphery of the body. The first tip surfaces define a first tip angle measured through the axis of rotation that is oblique. The second tip surfaces define a second tip angle measured through the axis of rotation that is smaller than the first tip angle.

In another embodiment the invention provides a method of manufacturing a drill bit. The method includes providing a piece of bar stock having a first end, a second end opposite the first end, and an axis of rotation extending centrally through the bar stock between the first and second ends. Next, cutting the first end of the bar stock to form a first tip angle at an oblique angle measured through the axis of rotation. Then, cutting the first end of the bar stock at a second tip angle measured through the axis of rotation to form first tip surfaces and second tip surfaces. Each set of first and second tip surfaces are positioned on opposite sides of the axis of rotation. The first tip surfaces have the first tip angle and the second tip surfaces have the second tip angle. The second tip angle is smaller than the first tip angle. Finally, forming a flute in the bar stock between the first and second ends and forming a shank at the second end of the bar stock.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
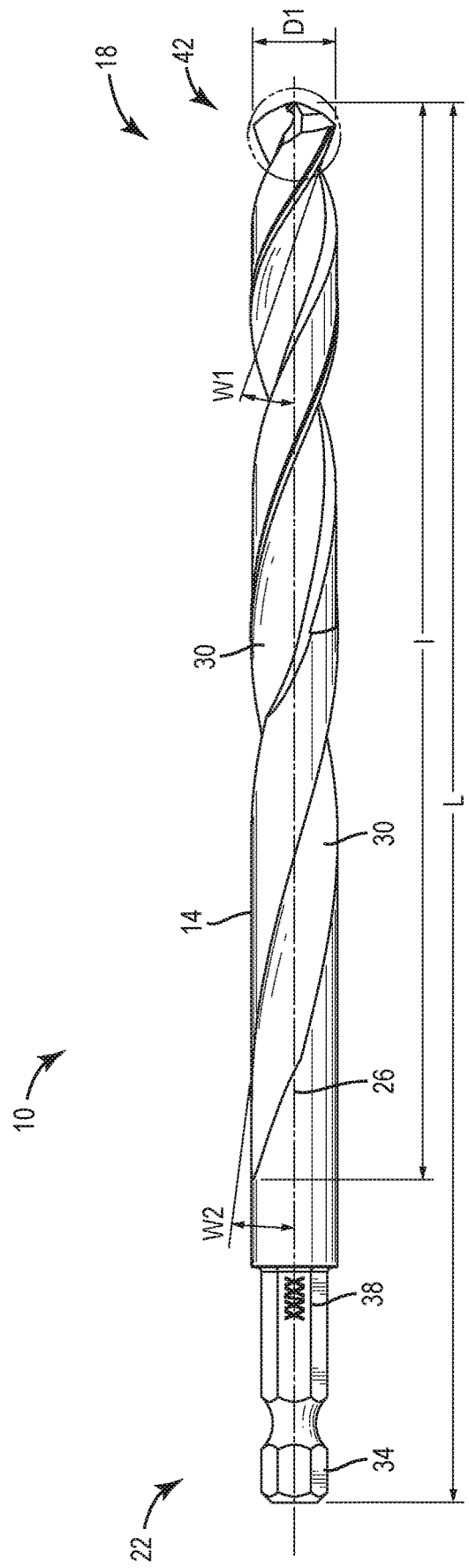
FIG. 1 is an elevational view of a drill bit.
Figure 2:
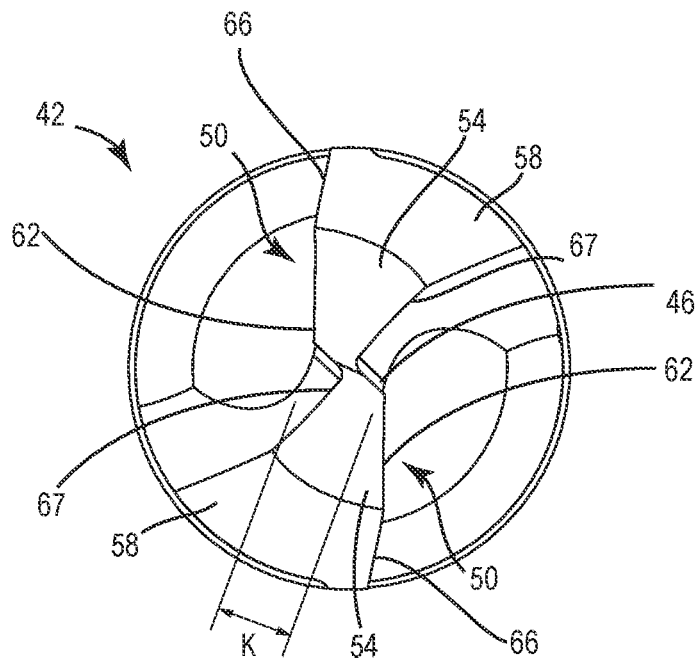
FIG. 2 is an end view of the drill bit of FIG. 1.
Figure 3:
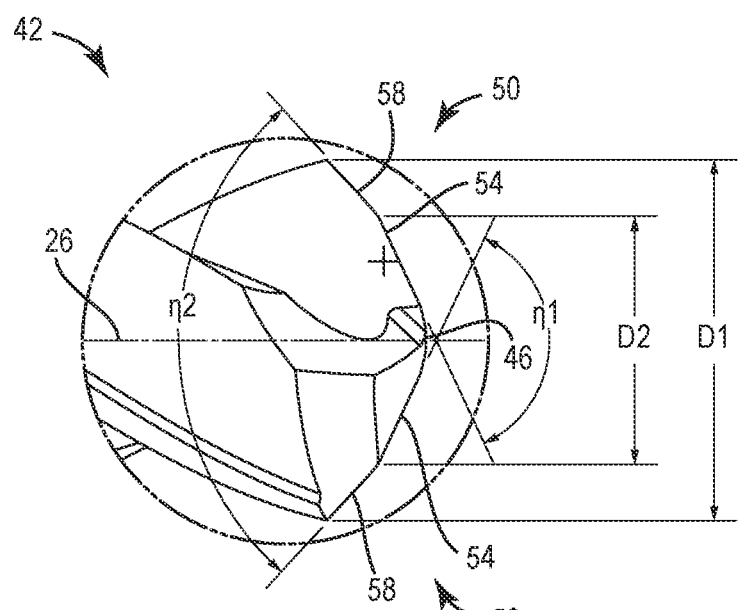
FIG. 3 is an enlarged side view of a cutting head of the drill bit of FIG. 1.

FIGS. 1-3 illustrate a drill bit 10 for use with a power tool, such as, for example, a drill, a driver drill, a screwdriver, and the like. The drill bit 10 may be used to cut holes or drill into a workpiece made out of brick, block, tile, metal, marble, concrete, plaster, wood, plastic, dry-wall, and the like. The illustrated drill bit 10 comes in a variety of sizes that correspond to the diameter of a hole to be created in a workpiece. For example, possible sizes of the drill bit 10 may be 3 mm, 6 mm, 9 mm", and 13 mm. In further embodiments, the drill bit 10 may be ⅛", ¼", ½", or the like. In other embodiments, the drill bit 10 may be other sizes.

With reference to FIG. 1, the drill bit 10 includes a body 14 having a first or workpiece-engaging end 18, a second or rearward end 22 configured to be received in a tool holder or chuck of a power tool, an axis of rotation 26 centrally located on the drill bit 10 and extending from the first end 18 to the second end 22, and flutes 30. The drill bit 10 may come in a variety of different lengths L defined between the first end 18 and the second end 22 based on the size of the drill bit 10. The length L of the drill bit 10 is in a range between 45 mm and 152 mm. The diameter D1 of the drill bit 10 is in a range of 3 mm to 15 mm With continued reference to FIG. 1, the second end 22 of the drill bit 10 includes a shaft or shank 34 that is configured to be coupled to a tool. In the illustrated embodiment, the shank 34 is hex-shaped. In other embodiments, the shank 34 may have other suitable shapes to be received in a power tool. The shank 34 is approximately one sixth to one third the total length L of the drill bit 10. The shank 34 may include laser etching 38 indicating to the user the size of the drill bit 10. In some embodiments, the shank 34 may be integrally formed with the drill bit 10. In other embodiments, the shank 34 may be welded to the remainder of the drill bit 10 or coupled using adhesive or other means.

In the illustrated embodiment, the drill bit 10 includes two flutes 30. In other embodiments, the drill bit 10 may include fewer or more flutes 30. The flutes 30 are helically wrapped around the body 14 of the drill bit 10 and extend from the first end 18 of the body 14 to the shank 34. Preferably, the flutes 30 extend at least half the length L of the body 14. Even more preferably, the flutes 30 have a length 1 between 20 mm and 114 mm. The flutes 30 are helically wrapped around the body 14 at a variable helix angle. In other words, the angle at which the flutes 30 wrap about the body 14 change as the flutes 30 extend from the first end 18 to the shank 34. In the illustrated embodiment, a helix angle W1 of each flute 30 adjacent the first end 18 is larger than a helix angle W2 of each flute 30 adjacent the shank 34. Preferably, the helix angle W1 of each flute 30 adjacent the first end 18 is between 30 degrees and 40 degrees, and the helix angle W2 of each flute 30 adjacent the shank 34 is between 15 degrees and 20 degrees. In some embodiments, the helix angles of the flutes 30 may gradually transition from the first helix angle W1 to the second helix angle W2. In further embodiments, the flutes 30 may have a constant helix angle.

With reference to FIGS. 2-3, the drill bit further includes a cutting head 42 positioned at the first end 18 of the body 14. The cutting head 42 includes a cutting tip 46 and a cutting portion 50. The cutting tip 46 is essentially on the axis of rotation 26. As shown in FIG. 2, the drill bit 10 further includes a web K that is defined as the width between the two flutes 30. The web K extends the full length 1 of the flutes 30. In some embodiments, the web K tapers from the second end 22 to the first end 18. In other words, the web K increases in thickness from the first end 18 to the second end 22. In the illustrated embodiment, the length of the web K at the cutting tip 46 is approximately one sixth the diameter D1 of the drill bit 10. Preferably, the length of the web K at the cutting tip 46 is between 0.5 mm and 2 mm.

With reference to FIG. 3, the cutting portion 50 includes a first tip surface 54 and a second tip surface 58. The illustrated cutting portion 50 includes two first tip surfaces 54 and two second tip surfaces 58, each set of first and second tip surfaces 54, 58 are positioned on one side of the cutting head 42. In other words, each set of first and second tip surfaces 54, 58 is positioned on diametrically opposite sides of the axis of rotation 26 from one another. Each set of tip surfaces 54, 58 are substantially the same. In other embodiments, the cutting portion 50 may include more than two sets of tip surfaces. The sets of tip surfaces 54, 58 are separated by the flutes 30. Each first tip surface 54 defines a first cutting edge 62 (FIG. 2) and each second tip surface 58 defines a second cutting edge 66 (FIG. 2). Each first tip surface 54 also defines a trailing edge 67 opposite the first cutting edge 62 that is angled relative to the first cutting edge 62. The first cutting edges 62 extend radially outward relative to the axis of rotation 26 to their respective second cutting edge 66, and the second cutting edges 66 extend from the respective first cutting edge 62 to the outer periphery of the body 14 of the drill bit 10. Each first and second cutting edge 62 extends continuously and linearly along the entire length of the respective first or second tip surface 54, 58. As shown in FIG. 2, the first cutting edges 62 are angled relative to the respective second cutting edge 66.

The first tip surfaces 54 extends radially outward from the axis of rotation 26 to their respective second tip surface 58, and the second tip surfaces 58 extends from the respective first tip surface 54 to the outer periphery of the body 14 of the drill bit 10. In other words, the first tip surfaces 54 extend a diameter D2 of the cutting head 42 at which point the cutting portion 50 is further chamfered to the second tip surfaces 58. The second tip surfaces 58 extends from the ends of the diameter D2 to the ends of the diameter D1 of the body 14 of the drill bit 10. In the illustrated embodiment, D2 is approximately two thirds the diameter D1. Preferably, the diameter D2 is between 4 mm and 10 mm. The first tip surfaces 54 act as a pilot tip for the drill bit 10 during a drilling operation.

The first tip surfaces 54 defines a first tip angle $\eta 1$ measured through the axis of rotation 26. The first tip angle $\eta 1$ is an oblique angle. More particularly, the first tip angle $\eta 1$ may be within a range between 130 degrees and 140 degrees. In some embodiments, the first tip angle $\eta 1$ is 135 degrees.

The second tip surfaces 54 defines a second tip angle $\eta 2$ measured through the axis of rotation 26. The second tip angle $\eta 2$ is smaller than the first tip angle $\eta 1$. For example, the second tip angle $\eta 2$ may be between 10% and 35% smaller than the first tip angle $\eta 1$. The second tip angle $\eta 2$ may be within a range between 100 and 130 degrees. In some embodiments, the second tip angle $\eta 2$ may be within a range between 110 degrees and 125 degrees. In other embodiments, the second tip angle $\eta 2$ may be within a range between 115 and 121 degrees. In further embodiments, the second tip angle $\eta 2$ may be 118 degrees.

To manufacture the drill bit 10, a cylindrical bar stock rod of metal, preferably a durable steel alloy, is provided. First, the first end 18 is transformed into a gently sloping cone-shaped tip. To accomplish this, a machine (e.g., a computer numerical control machine) rotates the drill bit 10 rapidly about the axis of rotation 26 while a first machining tool cuts (e.g., grinds) the first end 18 of the rod at an angle forming a cone. Specifically, the first end 18 is cut to produce the second tip surfaces 58 at the second tip angle $\eta 2$ prior to forming the first tip surfaces 54. Next, a second machining tool cuts (e.g., grinds) a portion of the cone or second tip surfaces 58 while the drill bit 10 is rotated. In particular, the second machining tool cuts the cone of the rod at an oblique angle relative to the axis of rotation 26 to form the first tip surfaces 54 at the first tip angle $\eta 1$, which separates the first tip surfaces 54 and first tip angles $\eta 1$ from the second tip surfaces 58 and second tip angles $\eta 2$. In other embodiments, the first machining tool may cut the first tip surfaces 54 at the first tip angle $\eta 1$ prior to forming the second tip surfaces 58. The second machining tool would then further cut a portion of the first tip surfaces 54 to form the second tip surfaces 58 at the second tip angle $\eta 2$.

The machine stops spinning the drill bit 10 and moves it into position for cutting the flutes 30. A third machining tool is then angled obliquely relative to the drill bit 10. The third machining tool moves parallel to the axis of rotation 26 from the first end 18 to the second end 22 while the machine slowly rotates the drill bit 10 forming the helical flutes 30. Finally, the second end 22 of the drill bit 10 is ground down by a fourth machining tool to form the hex shaped shank 34. In some embodiments, the flutes 30 and shank 34 may be formed prior to forming the tip surfaces 54, 58. In other, embodiments, the drill bit 10 may further be cut or ground to form cutting edges, cutting tips, or other tip surfaces. In further embodiments, the machining tools may all be the same tool or all different tools. Additionally, the same machining tool may be used more than once. Alternatively, the hex shank 34 may be separately formed and secured (e.g., welded) to the body 14.

Alternatively, in some embodiments, the first tip angle $\eta 1$ and the second tip angle $\eta 2$ may be formed at different magnitudes by separately grinding the tip surfaces 54, 58. For example, the cutting head 42 of the drill bit 10 may first be ground to form the second tip angle $\eta 2$, and then the drill bit 10 may be further ground to form the first tip angle $\eta 1$.

Generally, providing the first tip surfaces 54 at the first tip angle $\eta 1$ keeps the drill bit 10 from walking during a drilling operation, and the second tip surfaces 58 at the second tip angle 54 are good for drilling mild steel. In addition, providing a web K that tapers from the second end 22 to the first end 18 increases the durability of the drill bit In some embodiments, the drill bit 10 may be coated with a rust preventive coating that is applied to the entire drill bit 10. In further embodiments, the drill bit 10 may be coated with a PVD (physical vapor deposition) coating, such as titanium-nitride coating or with black oxide.

Various features and advantages of the invention are set forth in the following claims.

What is claimed is:

1. A drill bit comprising:
a body having a first end, a second end opposite the first end, and an axis of rotation extending centrally through the body from the first end to the second end;
a shank adjacent the second end, the shank configured to couple to a tool; and
a cutting head adjacent the first end, the cutting head including a cutting tip on the axis of rotation and a cutting portion, the cutting portion having first tip surfaces on diametrically opposite sides of the axis of rotation and second tip surfaces on diametrically opposite sides of the axis of rotation, each first tip surface extending radially outward from the cutting tip to a corresponding second tip surface, each second tip surface extending from a corresponding first tip surface to an outer periphery of the body, the first tip surfaces defining a first tip angle measured through the axis of rotation that is oblique, the second tip surfaces defining a second tip angle measured through the axis of rotation that is smaller than the first tip angle;
wherein each first tip surface defines a first cutting edge that is continuous and linear along an entire length of the first tip surface and a trailing edge that is angled relative to the first cutting edge, the first cutting edges extending radially outward relative to the axis of rotation,
wherein each second tip surface defines a second cutting edge that is continuous and linear along an entire length of the second tip surface, the second cutting edges extending radially outward from the first cutting edges to the outer periphery of the body;
wherein the first cutting edges are angled relative to the second cutting edges within a plane that is perpendicular to the axis of rotation; and
wherein an extension line defined by a portion of the trailing edge of each of the first tip surfaces is radially offset from the other of the first tip surfaces within the plane.

2. The drill bit of claim 1, wherein the first tip surfaces extend from the cutting tip to the second tip surfaces to define a first diameter of the cutting head, wherein the second tip surfaces extend from the first tip surfaces to the outer periphery of the body to define a second diameter of the cutting head, and wherein the first diameter is approximately two thirds the second diameter.

3. The drill bit of claim 2, wherein the first diameter is between 4 mm and 10 mm.

4. The drill bit of claim 3, wherein the second diameter defines an outer diameter of the drill bit, and wherein the second diameter is between 3 mm and 15 mm.

5. The drill bit of claim 1, wherein the first tip angle is within a range between 130 degrees and 140 degrees, and wherein the second tip angle is within a range between 100 and 130 degrees.

6. The drill bit of claim 5, wherein the first tip angle is 135 degrees, and wherein the second tip angle is 118 degrees.

7. The drill bit of claim 1, wherein the second tip angle is between 10% and 35% smaller than the first tip angle.

8. The drill bit of claim 7, wherein the second tip angle is approximately 13% smaller than the first tip angle.

9. The drill bit of claim 1, wherein the body further includes flutes that extend at least partially between the first and second ends.

10. The drill bit of claim 9, wherein the body defines a web extending between the flutes.

11. The drill bit of claim 10, wherein the web increases in thickness from the first end to the second end.

12. The drill bit of claim 9, wherein the flutes are helically wrapped around the body at a variable helix angle.

13. The drill bit of claim 12, wherein a helix angle of the flutes at a position adjacent the first end of the body is between 18 degrees and 35 degrees, and wherein a helix angle of the flutes at a position adjacent the second end of the body is between 15 and 25 degrees.

14. The drill bit of claim 1, wherein the body is coated with physical vapor deposition.

* * * * *